(12) United States Patent
Fontaine

(10) Patent No.: US 10,573,470 B2
(45) Date of Patent: Feb. 25, 2020

(54) SEAT SWITCH ASSEMBLY CONTROLLING ONE OR MULTIPLE DEVICES APPLICABLE WITHIN A VEHICLE SEAT

(71) Applicant: William G. Fontaine, Pompano Beach, FL (US)

(72) Inventor: William G. Fontaine, Pompano Beach, FL (US)

(73) Assignee: FONTAINE BRAKE COMPANY, Pompano Beach, FL (US)

( * ) Notice: Subject to any disclaimer, the term of this patent is extended or adjusted under 35 U.S.C. 154(b) by 0 days.

(21) Appl. No.: 16/019,101

(22) Filed: Jun. 26, 2018

(65) Prior Publication Data

US 2019/0393001 A1 Dec. 26, 2019

(51) Int. Cl.
*B60N 2/00* (2006.01)
*B60R 21/015* (2006.01)
*H01H 1/029* (2006.01)
*H01H 3/14* (2006.01)
*H01H 9/02* (2006.01)
*B60N 2/24* (2006.01)

(52) U.S. Cl.
CPC ............ *H01H 3/141* (2013.01); *H01H 1/029* (2013.01); *H01H 3/142* (2013.01); *H01H 9/0271* (2013.01); *B60N 2/002* (2013.01); *B60N 2/242* (2013.01); *B60R 21/01512* (2014.10); *B60R 21/01516* (2014.10); *H01H 2003/147* (2013.01); *H01H 2003/148* (2013.01)

(58) Field of Classification Search
CPC ........ H01H 3/141; H01H 3/142; H01H 1/029; H01H 9/0271; H01H 2003/148; H01H 2003/147; B60N 2/002; B60N 2/242; B60R 21/01512; B60R 21/01516
See application file for complete search history.

(56) References Cited

U.S. PATENT DOCUMENTS

| | | | | |
|---|---|---|---|---|
| 3,859,485 A | * | 1/1975 | Blinkilde | B60N 2/002 200/85 A |
| 5,695,859 A | * | 12/1997 | Burgess | H01H 1/029 200/85 R |
| 7,641,229 B2 | * | 1/2010 | Boisvert | B60N 2/002 180/273 |

* cited by examiner

*Primary Examiner* — Vanessa Girardi
(74) *Attorney, Agent, or Firm* — Oltman Flynn and Kubler

(57) ABSTRACT

A compression activated switch includes an electrically conductive contact layer pair formed of a conductive first contact layer for electrically connecting to a power source, and a conductive second contact layer spaced from the first contact layer for connecting to an application, and a resilient layer sandwiched between said first and second contact layers and having at least one resilient layer port; so that weight placed on the switch compresses the resilient layer and thereby advances said first contact layer toward said second contact layer until the first and second contact layers make electrically conductive contact through the at least one resilient layer port, closing the switch. A switch assembly includes multiple compression activated switches arrayed either horizontally or vertically and separated by insulating structures.

7 Claims, 8 Drawing Sheets

RECESSED INSTALLATION

SEAT SWITCH ASSEMBLY CONTROLLING ONE OR MULTIPLE DEVICES APPLICABLE WITHIN A VEHICLE SEAT

BACKGROUND OF THE INVENTION

1. Field of the Invention

The present invention relates generally to the field of switches. More specifically the present invention relates to a seat switch including a contact layer pair which preferably is oriented horizontally and is formed of an electrically conductive first contact layer, an electrically conductive second contact layer and a resilient layer preferably in the form of a foam layer sandwiched between the first and second contact layers and having resilient layer ports also referred to herein as foam layer ports. Portions of the first and second contact layers make contact with each other through the foam layer ports when the foam layer is compressed by sufficient weight placed on the seat switch. While the switch may include a foam layer with a single foam port, it is preferred for use in a typical seat that foam layer includes hundreds of small foam ports. The first contact layer preferably is connected to a power source, preferably by a conductive power line, and the second contact layer is connected to a device referred to herein as an application, preferably by a conductive application line. The first contact layer can be either above or below the second contact layer, depending on which arrangement is more structurally efficient for a given use. The seat switch may be embedded within or placed on top of a vehicle seat, such as that of a car, truck or bus, but many non-vehicle applications are contemplated as well, such as in a recliner chair. It is also contemplated that the seat switch may be used simply as a compression activated switch in or on a structure other than a seat.

The power line and application line preferably are soldered respectively to contact layers. The power line preferably includes a thermal fuse to protect the seat switch and connected application against overheating, and thus is essentially a surge protector. A protective and electrically-conductive envelope such as of a suitable plastic optionally surrounds the contact layer pair to seal the switch against the entry of moisture.

A seat switch assembly is also disclosed which inventively combines at least two of the compression activated seat switches. An individual seat switch, or a switch assembly, is placed under or embedded in a driver seat cushion generally horizontally. As a result, when a driver sits on the driver seat, the weight of the driver presses the first contact layer toward the second contact layer of each of the one or more contact layer pairs by compressing the foam layer between each given contact layer pair until at least a portion of the first contact layer makes electrically conductive contact with a corresponding a portion of the second contact layer through a foam layer port. The switch compression thereby closes each of the one or more individual seat switches and delivers electric current to corresponding connected applications. In this way, current can be delivered to multiple applications independently and essentially simultaneously. Each contact layer is conductive and preferably flexible so that the switch can comfortably bend and conform to a person on a seat incorporating the switch or switch assembly.

A switch assembly can be constructed in one of at least three ways, each of which is an embodiment of the present invention. The first preferred embodiment is the above-described individual seat switch itself. The second embodiment includes a first contact layer level defined by a generally horizontal series of discreet and electrically separate first contact layer segments, and a second contact layer level below and spaced vertically apart from the first contact layer level defined by a generally horizontal series of discreet and electrically separate second contact layer segments, such that each first contact layer segment corresponds to and vertically registers with an opposing second contact layer segment. The first contact layers forming a first contact layer level, and the second contact layers forming a second contact layer level, from each other by non-conductive separator strips. The horizontal series of opposing first contact layer segments and second contact layer segments are separated by a common foam layer having a foam layer port between and registering with each corresponding pair of first and second contact layers. A third embodiment includes contact layer pairs arrayed vertically to form a stack of switches. Each contact layer pair in the stack is separated from vertically adjacent contact layer pairs by electrically insulating sheets. In this way the contact layer pairs defining the switches making up the switch assembly are arrayed in a vertical series. A fourth embodiment combines the horizontally and vertically arrayed series of the second and third embodiments to provide a vertical stack of levels of horizontally arrayed series contact layer pairs, so that the stack is formed of contact layer levels and foam layers. Once again, horizontally arrayed contact layer pairs are electrically separated by separator strips, and vertically arrayed contact layer pairs are electrically separated by insulating sheets.

2. Description of the Prior Art

There have long been switches for various applications relating to vehicles. A number of prior switches are disclosed into the following patents: U.S. Pat. Nos. 3,487,451; 3,704,352; 3,860,773; 4,572,319; 6,737,595, and 5,120,980. What is needed is a reliable compression activated switch for embedding in a seat for controlling the flow of current to a device, as well as a seat switch assembly which compactly contains several switches for simultaneously and independently controlling the flow of current to several devices.

It is thus an object of the present invention to provide a sturdy, reliable and inexpensive compression activated switch which may take the form of a seat switch.

It is another object of the present invention to provide a switch assembly incorporating multiple compression activated switches which control a number of corresponding devices also referred to herein as applications and which are combined and simultaneously operated.

It is still another object of the present invention to provide such a switch assembly which can be incorporated into a variety of different objects, devices and environments, such as a vehicle driver seat or other type of seat in which the multiple switches are operated by the weight of a person sitting on and rising from the seat.

It is yet another object of the present invention to provide such a switch assembly in which each of the multiple switches includes a pair of electrically conductive contact layers which are vertically spaced apart from each other and separated by a resilient foam layer with foam layer ports.

It is a further object of the present invention to provide such a switch assembly in which the switches can be arrayed in either horizontal or vertical series which are structurally combined and yet electrically insulated from each other.

It is a still further object of the present invention to provide such a switch assembly which has the optional function of a delay pack, which are used for a variety of different applications such as anti-bounce, resettable fuses, or delaying the activation of other electrical circuits.

It is a yet further object of the present invention to provide such a switch assembly for controlling other applications which could be further expanded by having different weight sensing capabilities, such as altering the density of the foam or other weight sensing devices in order to control the degree of force delivered in an air bag application, and which would operate such that the electronics of one part of a sensor do not interfere with the electronics of other parts.

It is an additional object of the present invention to provide such a compression switch which can be used in vehicle and non-vehicle seats, such as by embedding the switch into a seat cushion, or contained in or take the form of a flat sheet which can be glued onto the outer surface of an existing seat cushion as an after-market or retro-fit accessory.

It is finally an object of the present invention to provide such a switch assembly which is sturdy, durable, light weight, easy to install and economical to manufacture.

SUMMARY OF THE INVENTION

The present invention accomplishes the above-stated objectives, as well as others, as may be determined by a fair reading and interpretation of the entire specification.

A compression activated switch is provided, including an electrically conductive contact layer pair formed of a conductive first contact layer for electrically connecting to a power source, and a conductive second contact layer spaced from the first contact layer for connecting to an application, and a resilient layer sandwiched between first the and second contact layers and having at least one resilient layer port; so that weight placed on the switch compresses the resilient layer and thereby advances the first contact layer toward the second contact layer until the first and second contact layers make electrically conductive contact through the at least one resilient layer port, closing the switch to thereby deliver electric current from a power source to an application connected to the second contact layer.

The switch preferably additionally includes a protective and electrically non-conductive envelope surrounding the contact layer pair. Each of the first and second contact layers preferably include a rubber sheet impregnated with conductive material fragments. The conductive material preferably is one of aluminum and carbon. The conductive material fragments preferably are one of conductive material shavings and conductive material powder. The envelope preferably is formed of plastic. The envelope optionally is laminated over the contact pair. The resilient layer preferably is a foam layer. The resilient layer preferably includes a number of resilient layer ports.

A compression activated switch assembly is also provided, including at least two compression activated switches, each switch preferably including an electrically conductive contact layer pair formed of a conductive first contact layer for electrically connecting to a power source, and a conductive second contact layer spaced from the first contact layer for connecting to an application, and a resilient layer sandwiched between the first and second contact layers and having at least one foam layer port; so that weight placed on the switch assembly compresses each resilient layer and thereby advances a first contact layer of each contact layer pair toward a corresponding second contact layer of each contact layer pair until the first and second contact layers make electrically conductive contact through the at least one resilient layer port of the resilient layer of the contact layer pair, closing all of the switches in the switch assembly and thereby delivering electric current from at least one power source to multiple applications connected to corresponding the switches.

A first contact layer level may be defined by a generally horizontal series of electrically separate first contact layer segments, and a second contact layer level below and spaced vertically apart from the first contact layer level may be defined by a generally horizontal series of electrically separate second contact layer segment, so that each first contact layer segment corresponds to and vertically registers with an opposing second contact layer segment, and the horizontal series of opposing first contact layer segments and second contact layer segments are separated by the common resilient layer so that each registering pair of opposing the contact layers defines a single contact layer pair and they collectively define a horizontal series of contact layer pairs, and the resilient layer includes at least one layer port for and registering with each respective pair of first and second contact layer segments.

The contact layer segments forming the first contact layer level, as well as the second contact layer segments forming the second contact layer level, preferably are electrically separated from each other by electrically insulating separator strips. Each separator strip preferably includes longitudinal grooves along opposing strip sides, each for receiving an edge of a contact layer. The contact layer pairs are arrayed vertically according to one embodiment to form a stack of switches, each contact layer pair in the stack being separated from vertically adjacent contact layer pairs by electrically insulating means. The contact layer pairs according to another embodiment are arrayed both horizontally and vertically to provide a vertical stack of a horizontally arrayed series of contact layer pairs. The switch assembly optionally includes a stack of contact layer levels and foam layer levels, such that the horizontally arrayed contact layer pairs are electrically separated by separator strips and vertically arrayed contact layer pairs are electrically separated by insulating sheets. The resilient layer preferably is a foam layer. The resilient layer preferably includes a number of the resilient layer ports.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
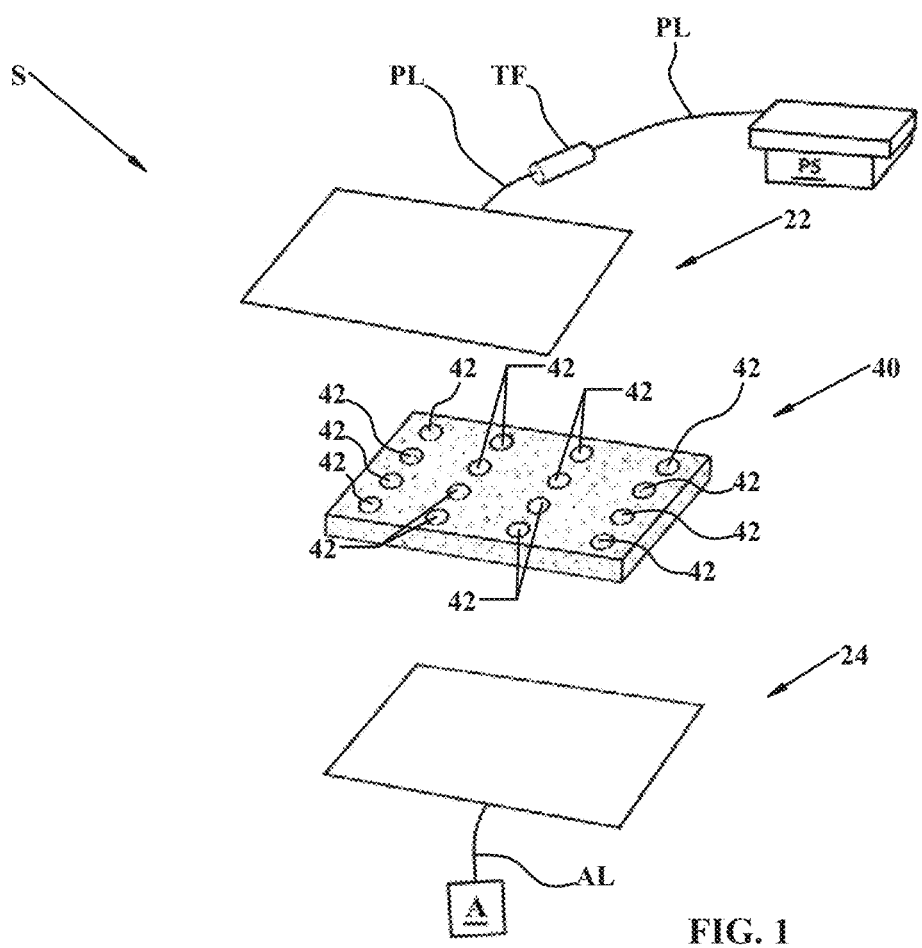
FIG. 1 is a perspective, exploded view of an individual seat switch according to the first preferred embodiment of the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the FIGURES are designated by the same reference numerals.

The Invention Generally and the First Preferred Embodiment

Figure 2:
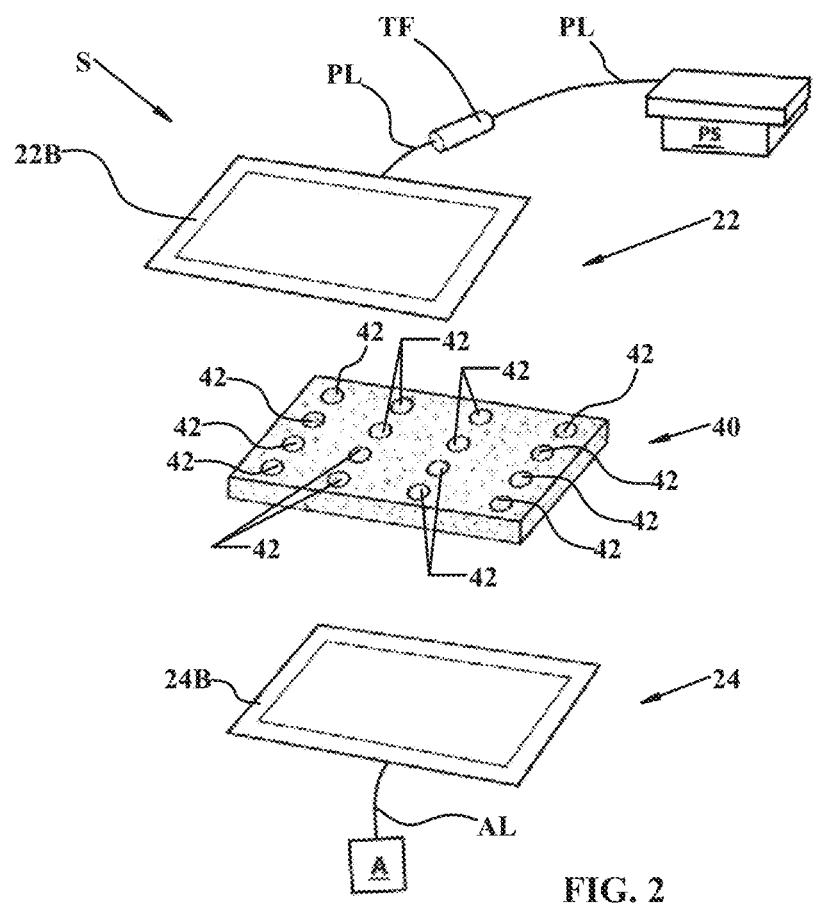
FIG. 2 is a view as in FIG. 1 showing the first and second contact layers with the optional non-conductive sheet borders.
Figure 3:
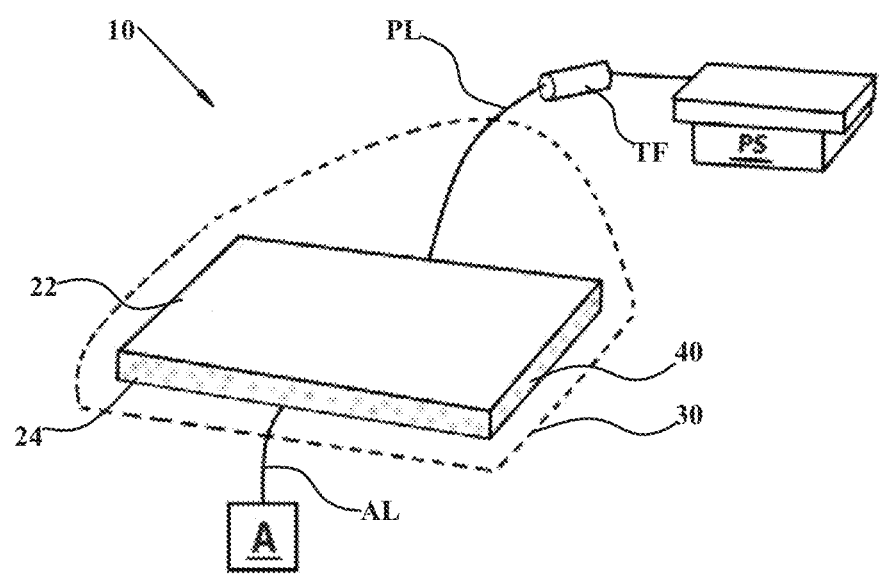
FIG. 3 is a perspective, assembled view of the first preferred embodiment of FIG. 1.
Figure 4:
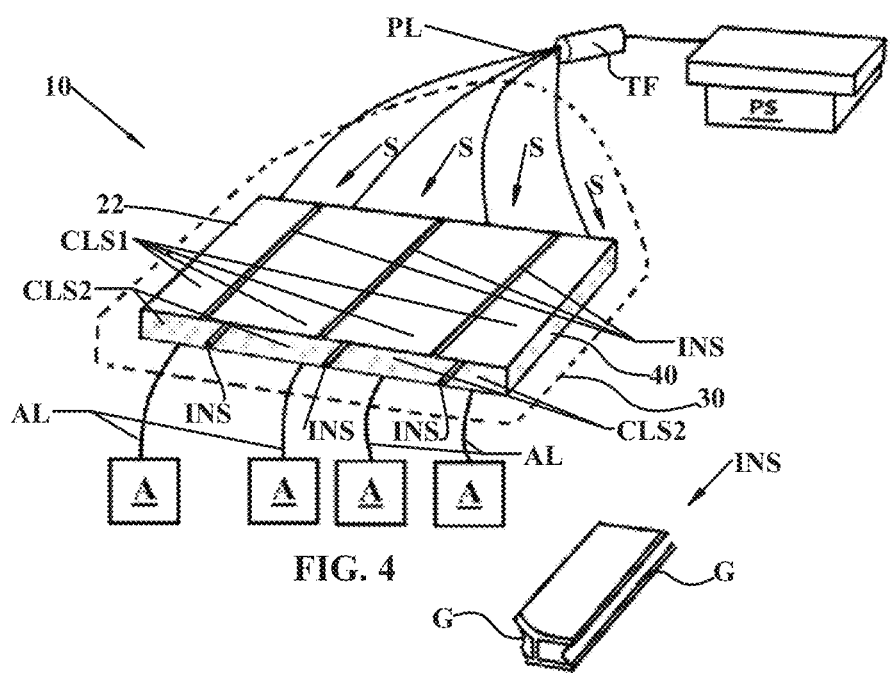
FIG. 4 is a perspective view of the seat switch assembly of the second preferred embodiment, having the laterally arrayed contact layer pairs defining switches, each controlling a different application.
Figure 5:
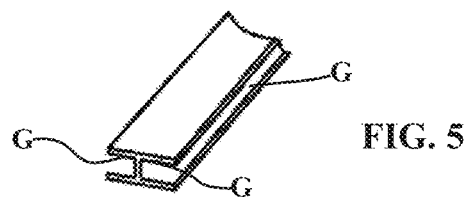
FIG. 5 is a broken away perspective view of an insulating separator strip of FIG. 4.
Figure 6:
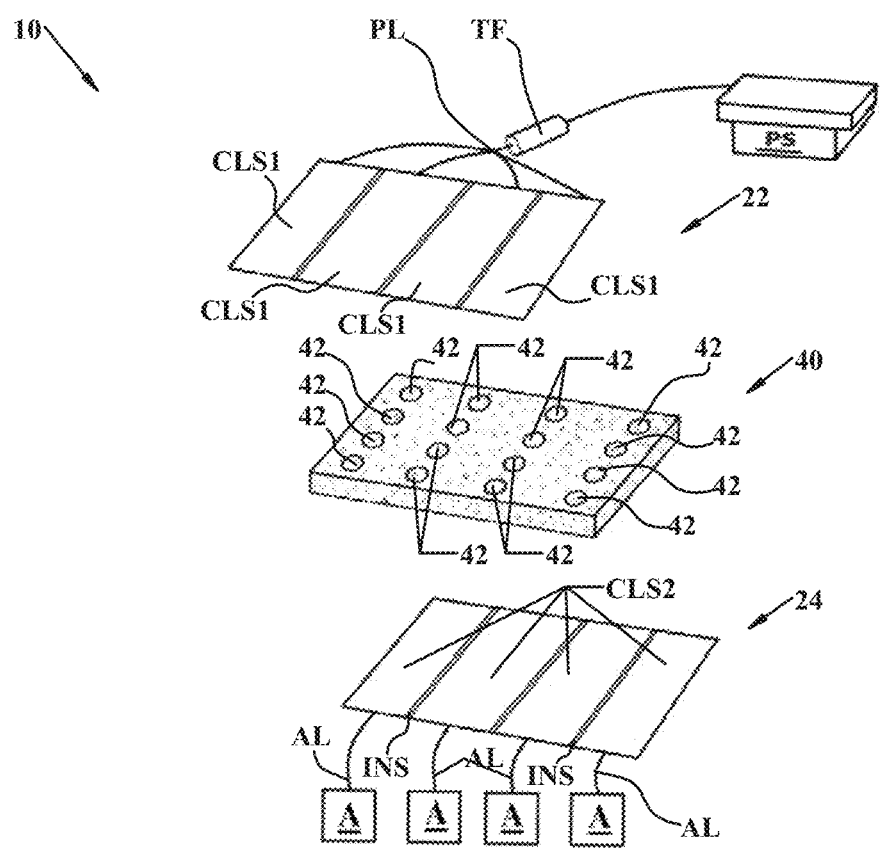
FIG. 6 is an exploded view of the assembly of FIG. 4.
Figure 7:
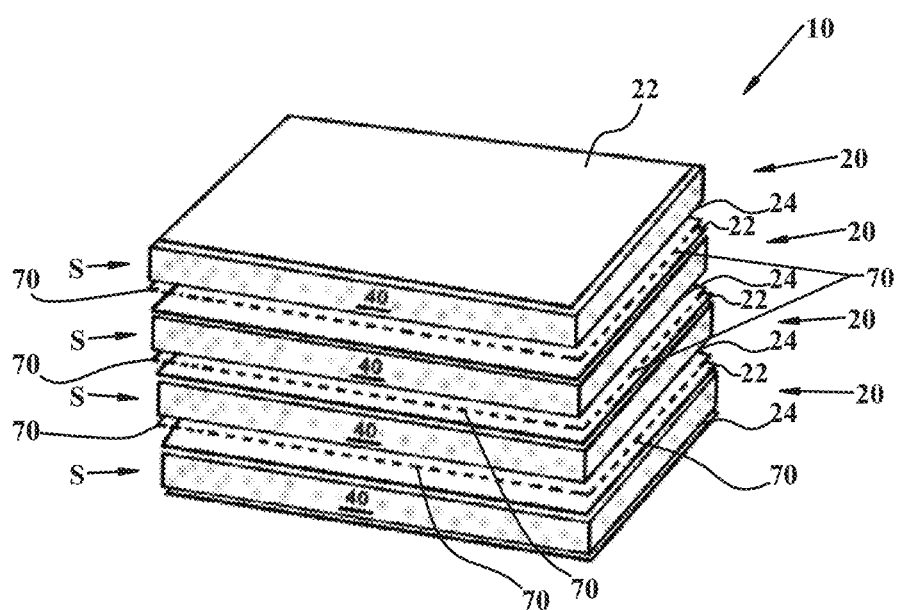
FIG. 7 is an assembled, perspective view of the seat switch assembly of the third preferred embodiment, having vertically arrayed or stacked contact layer pairs.
Figure 8:
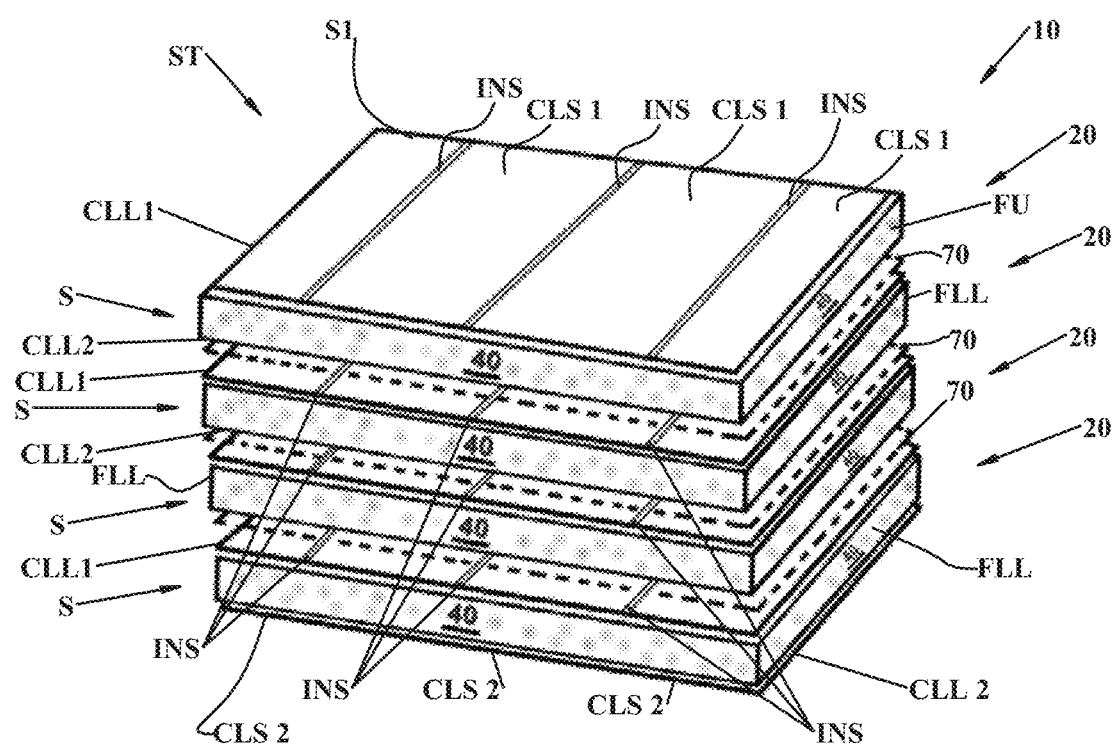
FIG. 8 is a perspective view of the seat switch assembly of the fourth preferred embodiment having both horizontally and vertically arrayed series of contact layer pairs.
Figure 9:
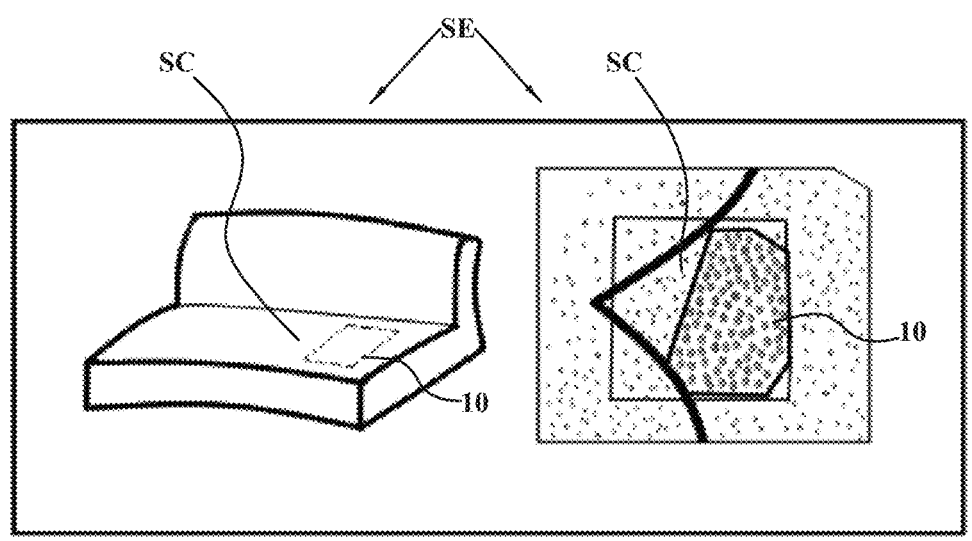
FIG. 9 is an exemplary, assembled, perspective view of the seat switch assembly fitted into a recess in the foam of a driver seat underneath the upper seat layer.

Referring to FIGS. 1-9, a seat switch S is disclosed which includes a contact layer pair 20 which preferably is oriented horizontally and is formed of an electrically conductive first contact layer 22, and an electrically conductive second contact layer 24 and a resilient layer 40 preferably in the form of a foam layer 40 sandwiched between the first and second contact layers 22 and 24 and having resilient layer ports also referred to as foam layer ports 42. See FIG. 1. Portions of the first and second contact layers 22 and 24 make contact with each other through the foam layer ports 42 when the foam layer 40 is compressed by sufficient weight placed on the seat switch S. While the switch S may include a foam layer 40 with a single foam port 42, it is preferred that foam layer 40 includes hundreds of small foam ports 42. The first contact layer 22 is connected to a power source PS, preferably by a power line PL and the second contact layer 24 is connected to a device referred to herein as an application A, preferably through an application line AL. The power line PL and application line AL preferably are soldered respectively to contact layers 22 and 24. Power line PL preferably includes a thermal fuse TF to protect the seat switch S and application A against overheating. In contemplated examples of seat switch S, the thickness of foam layer 40 is substantially one quarter inch and the thickness of each of the contact layers 22 and 24 is substantially 6 millimeters to one quarter inch. It is noted that these are only examples and should not be viewed as in any way limiting.

A protective and electrically non-conductive envelope 30 such as of a suitable plastic optionally surrounds the contact layer pair 20. The envelope 30 may be a plastic bag sealed around and loosely enclosing the contact layer pair 20 or may be created by laminating the contact layer pair 20. See FIG. 2. Alternatively, contact layers 22 and 24 have non-conductive sheet borders 22B and 24B, respectively, which are bonded together face to face to seal the switch S against the entry of moisture. See FIG. 3. It is contemplated that there are instances in which the envelope 30 would be omitted. An example would be where the switch is made electro-sensitive on one side or contact layer only, and the other side or contact layer is made non-conductive.

Seat Switch Assembly

A seat switch assembly 10 is also disclosed which inventively combines at least two of the compression activated seat switches S. An individual seat switch S, or a switch assembly 10, is placed under or embedded in a driver seat cushion SC generally horizontally. As a result, when a driver sits on the driver seat SE, the weight of the driver presses the first contact layer 22 toward the second contact layer 24 of each of the one or more contact layer pairs 20 by compressing the foam layer 40 between each given contact layer pair 20 until at least a portion of the first contact layer 22 makes electrically conductive contact with a corresponding a portion of the second contact layer 24 through a foam layer port 32. See FIG. 9. The switch S compression thereby closes each of the one or more individual seat switches S and delivers electric current to corresponding applications A. In this way, current can be delivered to multiple applications A independently and essentially simultaneously. See FIGS. 4, 7 and 8.

Each contact layer 22 or 24 is conductive and preferably flexible to comfortably bend and conform to a person on a seat SE incorporating the switch S or switch assembly 10. To this end, each contact layer 22 and 24 preferably is formed of a flexible, non-conductive sheet material, such as of rubber, plastic or vinyl, impregnated with fragments of conductive material, preferably in the form of aluminum shavings or powder, or carbon shavings or powder. Thus, the use of infused plastic sheeting is contemplated. Copper fragments are less preferred because of copper's galvanic effect and oxidation. The preferred ratio is 25 percent fragments of conductive material, preferably aluminum, mixed with 75 percent non-conductive material, preferably rubber. While this ratio is preferred, others are also suitable. Sheet material which itself is conductive and therefore does not require the addition of conductive material, such as aluminum screen, can also be used, but is less preferred because of cost. The foam forming the foam layer 40 can be either open or closed cell.

A switch assembly 10 can be constructed in one of at least three ways, each of which is an embodiment of the present invention. The first embodiment is individual seat switch S.

Second Preferred Embodiment

For the second embodiment, a series of contact layer pairs 20 are integrated and arrayed horizontally. A first contact layer level CLL1 is defined by a generally horizontal series of discreet and electrically separate first contact layer segments CLS1, and a second contact layer level CLL2 below and spaced vertically apart from the first contact layer level CLL1 is defined by a generally horizontal series of discreet and electrically separate second contact layer segments CLS2, such that each first contact layer segment CLS1 corresponds to and vertically registers with an opposing second contact layer segment CLS2. See FIGS. 2 and 4. The horizontal series of opposing first contact layer segments CLS1 and second contact layer segments CDLS2 are separated by a common foam layer 40. Each registering pair of opposing contact layers CL1 and CL2 defines a single contact layer pair 20 and they collectively define a horizontal series of contact layer pairs 20 and therefore switches S.

The foam layer 40 helps structurally hold the pairs of opposing first and second contact layers 22 and 24 together. The contact layer segments CLS1 forming the first contact layer level CLL1, as well as the second contact layer segments CLS1 forming the second contact layer level CLL2, preferably are electrically separated from each other by electrically insulating separator strips INS. The separator strips INS preferably each have longitudinal grooves G in opposing strip sides to receive edges of adjacent first contact layers 22 or second contact layers 24. See FIG. 4.

Third Preferred Embodiment

For a third embodiment, contact layer pairs 20 are arrayed vertically to form a stack ST of switches S. See FIG. 7. Each contact layer pair 20 in the stack ST is separated from vertically adjacent contact layer pairs 20 by electrically insulating sheets 70, which are each preferably made of a suitable plastic. In this way the contact layer pairs 20 defining the switches S making up the switch assembly 10 are arrayed in a vertical series, rather than laterally as in the generally horizontal series of the second embodiment.

Fourth Preferred Embodiment

A fourth embodiment combines the horizontally and vertically arrayed series of the second and third embodiments to provide a vertical stack ST of horizontally arrayed series of contact layer pairs 20. See FIG. 8. Thus, the fourth embodiment includes a stack ST of contact layer levels CLL and foam layer levels FLL. Once again, horizontally arrayed contact layer pairs 20 are electrically separated by separator strips INS, and vertically arrayed contact layer pairs 20 are electrically separated by insulating sheets 70.

Exemplary Applications Controlled by the Seat Switch or Seat Switch Assembly

A single seat switch S preferably is connected to and controls a single application A. The present seat switch assembly 10 incorporates multiple contact layer pairs 20 so that it can control a number of different, independently connected, corresponding applications A.

It is contemplated that one of the applications A is a seat heater in the form of mesh of resistance elements such as an aluminum screen, embedded in a non-conductive, flexible panel such as of rubber. Another exemplary application A is a relay for sending information to a central microprocessor such as in a vehicle dashboard or remote vehicle monitoring and control station about which seats are occupied and for what periods of time. This application optionally includes a camera mounted in the vehicle, such as a commercial truck, to ensure that the correct number of workers are present and, where a camera is incorporated, to identify the workers. Still another exemplary application A is an air bag control switch which determines whether a person is in a given vehicle seat to activate the airbag corresponding to the given seat, and by the same token to deactivate the airbag when the seat is unoccupied. For this application A the seat switch S may include a weight measurement device so that information can be relayed to the air bag system regulating how fast the airbag is deployed so that the rate of deployment is appropriate for a person of a given weight.

Yet another contemplated application A is in bus seats. Once again, as described for the truck application A above, a still camera or video camera or camera system is provided to monitor and store photographic data of bus passengers. Such data would be useful, for example, if the bus is involved in a traffic accident and there is a need to verify who was actually on the bus at the time, in the event of passenger litigation against the bus company. Further, such data would be useful to determine whether a passenger was carrying any bags in the event that they claim that their bags were stolen or that they left them on the bus. Still further, such data could be useful in determining at which stops a passenger entered the bus and at which stop the passenger exited. Another contemplated application A is vehicle seat sensors or a seat sensor system to determine when a person is sitting on a given seat, such as the driver, the passengers or both, and to keep track of how many people are in the vehicle altogether. As noted elsewhere in this paper, the present switch may be used in both vehicle and non-vehicle applications and environments, and in seats or in items other than seats.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A compression activated switch assembly, comprising:
   at least two compression activated switches, each said switch comprising an electrically conductive contact layer pair formed of a conductive first contact layer for electrically connecting to a power source, and a conductive second contact layer spaced from said first contact layer for connecting to an application, and a resilient layer sandwiched between said first and second contact layers and having at least one foam layer port;
   such that weight placed on the switch assembly compresses each resilient layer and thereby advances a first contact layer of each contact layer pair toward a corresponding second contact layer of each contact layer pair until said first and second contact layers all make electrically conductive contact through the at least one resilient layer port of the resilient layer of the contact layer pair, closing all of said switches in the switch assembly and thereby delivering electric current from at least one power source to multiple applications connected to corresponding said switches;
   wherein a first contact layer level is defined by a generally horizontal series of electrically separate said first contact layer segments, and a second contact layer level below and spaced vertically apart from said first contact layer level is defined by a generally horizontal series of electrically separate said second contact layer segments, such that each first contact layer segment corresponds to and vertically registers with an opposing second contact layer segment,
   and wherein said horizontal series of opposing said first contact layer segments and said second contact layer segments are separated by the common resilient layer such that each registering pair of opposing said contact layers defines a single contact layer pair and they collectively define a horizontal series of contact layer pairs, and said resilient layer comprises at least one resilient layer port for and registering with each respective pair of first and second contact layer segments.

2. The switch assembly of claim 1, wherein said contact layer segments forming said first contact layer level, as well as said second contact layer segments forming said second contact layer level, are electrically separated from each other by electrically insulating separator strips.

3. The switch assembly of claim 2, wherein each said separator strip comprises opposing separator strip sides and longitudinal grooves along said opposing separator strip sides, each said longitudinal groove being for receiving an edge of a contact layer.

4. A compression activated switch assembly, comprising:
at least two compression activated switches, each said switch comprising an electrically conductive contact layer pair formed of a conductive first contact layer for electrically connecting to a power source, and a conductive second contact layer spaced from said first contact layer for connecting to an application, and a resilient layer sandwiched between said first and second contact layers and having at least one foam layer port;
such that weight placed on the switch assembly compresses each resilient layer and thereby advances a first contact layer of each contact layer pair toward a corresponding second contact layer of each contact layer pair until said first and second contact layers all make electrically conductive contact through the at least one resilient layer port of the resilient layer of the contact layer pair, closing all of said switches in the switch assembly and thereby delivering electric current from at least one power source to multiple applications connected to corresponding said switches;
wherein said contact layer pairs are arrayed vertically to form a stack of switches, each said contact layer pair in said stack is separated from vertically adjacent contact layer pairs by electrically insulating means.

5. The switch assembly of claim 4, wherein said electrically insulating means comprises sheets of plastic.

6. A compression activated switch assembly, comprising:
at least two compression activated switches, each said switch comprising an electrically conductive contact layer pair formed of a conductive first contact layer for electrically connecting to a power source, and a conductive second contact layer spaced from said first contact layer for connecting to an application, and a resilient layer sandwiched between said first and second contact layers and having at least one foam layer port;
such that weight placed on the switch assembly compresses each resilient layer and thereby advances a first contact layer of each contact layer pair toward a corresponding second contact layer of each contact layer pair until said first and second contact layers all make electrically conductive contact through the at least one resilient layer port of the resilient layer of the contact layer pair, closing all of said switches in the switch assembly and thereby delivering electric current from at least one power source to multiple applications connected to corresponding said switches;
wherein said contact layer pairs are arrayed both horizontally and vertically to provide a vertical stack of a horizontally arrayed series of contact layer pairs.

7. The switch assembly of claim 6, comprising a stack of contact layer levels and foam layer levels, such that said horizontally arrayed contact layer pairs are electrically separated by separator strips and vertically arrayed contact layer pairs are electrically separated by insulating sheets.

* * * * *